(12) United States Patent
Duan et al.

(10) Patent No.: US 9,719,584 B1
(45) Date of Patent: Aug. 1, 2017

(54) TWO-SPEED TRANSAXLE FOR ELECTRIC VEHICLE

(71) Applicant: Guangzhou Sunmile Dynamic Technologies Corp., LTD, Guangzhou, Guangdong (CN)

(72) Inventors: Fuhai Duan, Fujian (CN); Yu Wang, Guangdong (CN); Jun Chen, Guangdong (CN)

(73) Assignee: GUANGZHOU SUNMILE DYNAMIC TECHNOLOGIES CORP., LTD, Guangzhou (CN)

( * ) Notice: Subject to any disclaimer, the term of this patent is extended or adjusted under 35 U.S.C. 154(b) by 0 days.

(21) Appl. No.: 15/455,156

(22) Filed: Mar. 10, 2017

(30) Foreign Application Priority Data

May 25, 2016 (CN) .......................... 2016 1 0364218
May 25, 2016 (CN) ..................... 2016 2 0491168 U
Aug. 22, 2016 (CN) .......................... 2016 1 0702192
Aug. 22, 2016 (CN) .......................... 2016 1 0703138
Aug. 22, 2016 (CN) .......................... 2016 1 0704399

(51) Int. Cl.
*F16H 48/06* (2006.01)
*F16H 37/08* (2006.01)
*F16H 3/66* (2006.01)
*F16H 61/30* (2006.01)
*B60K 17/08* (2006.01)
*B60K 17/16* (2006.01)

(52) U.S. Cl.
CPC ......... *F16H 37/0813* (2013.01); *B60K 17/08* (2013.01); *B60K 17/165* (2013.01); *F16H 3/66* (2013.01); *F16H 61/30* (2013.01); *F16H 2200/0021* (2013.01); *F16H 2200/0034* (2013.01); *F16H 2200/201* (2013.01)

(58) Field of Classification Search
None
See application file for complete search history.

(56) References Cited

U.S. PATENT DOCUMENTS

| 4,283,968 | A  | * | 8/1981  | Kalns  | B60K 1/00 188/170  |
| 6,484,834 | B2 | * | 11/2002 | Bowen  | B60K 6/365 180/65.25 |
| 8,049,384 | B2 | * | 11/2011 | Wilton | B60K 1/00 310/75 R |

(Continued)

FOREIGN PATENT DOCUMENTS

DE 102010024602 A1 * 12/2011 ............... F16H 1/46

*Primary Examiner* — Dirk Wright

(57) ABSTRACT

A two-speed transaxle for an electric vehicle has an input shaft receiving power from an electric motor, and two output shafts delivering power to drive the vehicle. At least one epicylic gear set is used. Each epicylic gear set has only an outer gear member, each of which meshingly engage a plurality of planet gears supported on a common carrier. The two-speed transaxle produces its first forward speed ratio when a first caliper brake system and a second caliper brake system are disengaged and a one-way clutch connects the first sun gear to the transaxle casing. Second forward speed ratio results when the second hydraulic brake is engaged to fix the second sun gear. Reverse drive and regenerative operation result when the first hydraulic brake fixes the first sun gear and the direction of power flow is reversed.

9 Claims, 9 Drawing Sheets

(56) References Cited

U.S. PATENT DOCUMENTS

| | | | |
|---|---|---|---|
| 8,998,765 B2 * | 4/2015 | Sten | F16H 48/36 |
| | | | 475/150 |
| 9,067,491 B2 * | 6/2015 | Tanaka | F16H 3/663 |
| 9,500,267 B2 * | 11/2016 | Ting | B60K 17/165 |
| 2012/0149520 A1 * | 6/2012 | Schneidewind | B60L 15/20 |
| | | | 475/149 |

* cited by examiner

TWO-SPEED TRANSAXLE FOR ELECTRIC VEHICLE

CROSS REFERENCE TO RELATED APPLICATIONS

The present application claims the benefit of Chinese Patent Application No. 201610364218.4, filed on May 25, 2016; Chinese Patent Application No. 201610704399.0, filed on Aug. 22, 2016; Chinese Patent Application No. 201610703138.7, filed on Aug. 22, 2016; Chinese Patent Application No. 201610702192.X, filed on Aug. 22, 2016; and Chinese Utility Model Application No. 201620491168.1, filed on May 25, 2016, the disclosure of all of which are hereby incorporated by reference in their entirety.

BACKGROUND OF THE INVENTION

Technical Field

The invention relates generally to vehicular transaxle and more particularly to a vehicular transaxle that is capable of receiving input power from a source of stored electrical energy. Specifically, the invention relates to a two-speed transaxle that utilizes at least one epicyclic gear set that is operatively connected to an electric motor and caliper brake system as well as a driving gear that is used to transmit power to differential assembly.

It has therefore already been proposed to use two-speed transaxle as drive trains for electric vehicles. Conventional two-speed transaxles include an input shaft having two driving gears. Speed selection is achieved by sliding a synchronizer sleeve between two positions on an intermediate shaft assembly. A drive pinion of a final drive gear set may be part of the intermediate shaft assembly. A final drive output gear is attached to a bevel and side gear differential assembly that distributes output torque to left and right wheels of an electric vehicle. If such a two-speed transaxle is used, the electric drive trains can be of smaller design, which results in a clear cost benefit. However, the very configuration of the transmission with a sliding synchronizer sleeve causes a drop in traction force during shifting, for electric vehicles such a drop in traction force means a substantial sacrifice of comfort, which is not acceptable to the driver.

SUMMARY OF THE INVENTION

It is an object of the invention to provide a two-speed transaxle for a drive train of a vehicle, preferably for use in a drive train for electric vehicles, in an auxiliary drive train for hybrid vehicles, whereby shifting without an interruption of traction, "load shifting" is enabled.

The two-speed transaxle has the advantage that the two-speed transaxle has a compact configuration. The torque produced by the electric motor is introduced via the base gear sun into the epicyclic gear set. By this, it is again achieved, that the epicyclic gear set has no ring gear, and thereby the two-speed transaxle has a small radial construction size.

The two-speed transaxle is suitable as an exclusive drive for a vehicle or as an additional drive source in a vehicle, which has a combustion engine as the main drive source, which are also designated as hybrid drives. The two-speed transaxle can be used for any drive axle, i.e. front axle as well as rear axle.

According to an especially preferred exemplary embodiment, the regulatable clutch system is designed as a caliper disc brake system with a dry brake disc having at least one pair pad plates and one pair of independent hydraulic pistons. As the caliper disc brake system is mounted on outside of the transaxle casing, there are very small stirring oil loss and without shifting heat (the produced heat from shifting is transmitted to free air) which results the high efficiency and high reliability for the two-speed transaxle.

According to an especially preferred exemplary embodiment, As the two-speed transaxle produces its first forward speed ratio when a first caliper brake system and a second caliper brake system are disengaged and a one-way clutch connects the first sun gear to the transaxle casing, there are small wasting power for shifting and high driving reliability for the electric vehicle.

In general, a two-speed transaxle embodying the concepts of the present invention utilizes an input means to receive power from the electric motor and a power output means to deliver power to drive the vehicle. The electric motor is connected to energy storage devices, such as batteries, so that the energy storage devices can accept power from, and supply power to, the electric motor. A control unit regulates power flow between the energy storage devices and the electric motor.

A two-speed transaxle for an electric vehicle is proposed, which is compact and enables a simple integration into existing space requirements. More specifically, an electric two-speed transaxle for a vehicle is disclosed that comprises an electric motor and two-speed transmission that is driveable by the electric motor. The two-speed transmission has an epicyclic gear set, two sage gears, two hydraulic disc brake systems and a differential assembly. The electric motor, brake discs and the epicyclic gear set are arranged coaxially to a rotational axis. The epicylic gear set comprises a base sun gear, a first sun gear, a second sun gear, a plurality of base planet gears, a plurality of first planet gears, a plurality of second planet gears as well as a common planet carrier, wherein the base sun gear having a rotationally fixed connection to the input shaft is rotatingly driveable by the electric motor around the rotational axis. The first sun gear may be rotationally fixed to or formed on the first brake disc. The second sun gear may be rotationally fixed to or formed on the second brake disc. The output gear of the epicylic gear set may be rotationally fixed to or formed on the planet carrier. A final stage gears is attached to a differential carrier of the differential assembly that distributes output torque to left and right wheels of an electric vehicle.

The two-speed transaxle also has the first and second shifting system comprises a first and second shifting electric motors, a first and second hydraulic actuator cylinders, a first and second pressure warning switches as well as a first and second oil tanks, the first and second hydraulic actuator cylinder walls are connected to the first and second oil tanks at the front of the first and second hydraulic actuator cylinders, respectively, and the openings to the first and second pressure warning switches and the braking circuits at the back of the first and second hydraulic actuator cylinders, the first and second hydraulic actuator cylinders may be mounted on outside of the two-speed transaxle casing or the vehicle floor, the first and second hydraulic actuator cylinders are operated by the force applied by the first and second shifting electric motors by driving an actuator screw, respectively.

In some embodiments of the present invention, the electric motor rotor shaft is hollow and the second dry disc is mounted on the left back-end of the electric motor and operated to produce the second forward speed ratio for the two-speed transaxle. In addition, in some embodiments, the second brake shaft is hollow and the second dry disc is mounted on the interspaces between the electric motor casing and the transaxle casing.

To acquaint persons skilled in the arts most closely related to the present invention, three highly preferred alternative embodiments of a two-speed transaxle that illustrate the best modes now contemplated for putting the invention into practice are described herein by, and with reference to, the annexed drawings that form a part of the specification. The exemplary transaxles are described in detail without attempting to show all of the various forms and modification in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

DESCRIPTION OF THE EXEMPLARY EMBODIMENTS

Description of the Exemplary Preferred Embodiment

Figure 1:
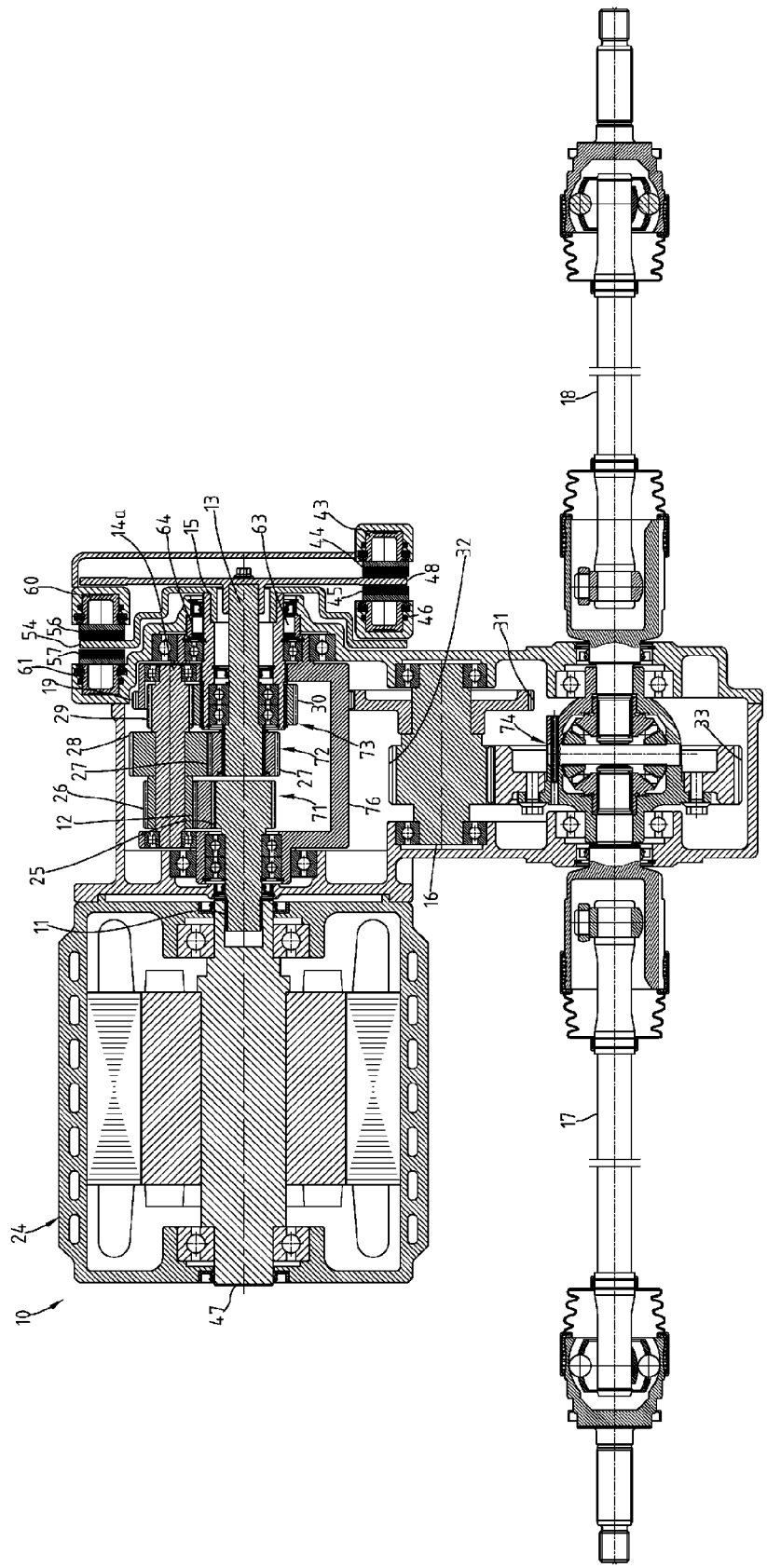
FIG. 1 is a diagrammatic, longitudinal cross section view of a two-speed transaxle according to a first representative preferred embodiment of the invention.
Figure 2:
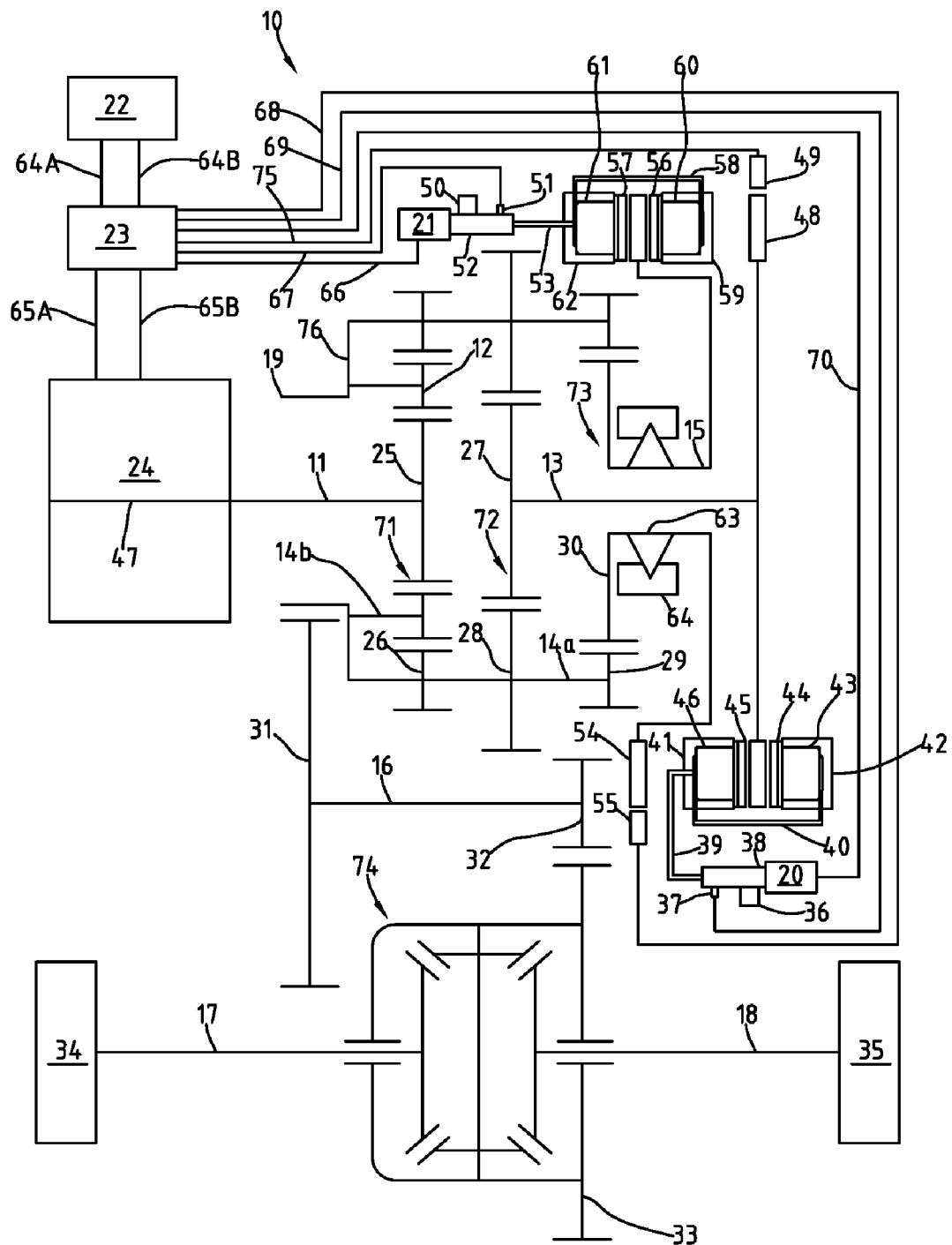
FIG. 2 is a schematic representation of the two-speed transaxle depicted in FIG. 1.

One representative form of a two-speed transaxle embodying the concepts of the invention is designated generally by the numeral 10 on FIGS. 1 and 2. In particular, FIGS. 1 and 2 show that the two-speed transaxle 10 includes an electric motor 24 and a power input device, the power input device includes a input shaft 11, a base epicylic gear set 71, a first epicylic gear 73, a second epicylic gear 72, and a differential assembly 74. The two-speed transaxle 10 is intended for use in a vehicle (not shown), such as an electric vehicle or hybrid vehicle, that is driven by an driver.

Referring to FIG. 2, the two-speed transaxle 10 selectively receives power from the electric motor 24 and an electric storage device 22. The two-speed transaxle 10 can also receive feed-back power from a vehicle right axle 18 and left axle 17, as will be hereinafter more fully described, when the vehicle is decelerating. In this exemplary embodiment, the electric motor 24 is a variable-speed alternating current motor, and the electric storage device 22 is one or more batteries. Other electric storage devices which have the ability to store electric power and dispense electric power may be used in place of the batteries without altering the concepts of the present invention. The electric storage device 22 communicates with an electrical control unit (ECU) 23 by two first transfer conductors 64A, 64B. The ECU 23 communicates with the electric motor 24 by two second transfer conductors 65A, 65B, and the ECU 23 similarly communicates with a first shifting electric motor 21 by a third transfer conductor 66 and a second shifting electric motor 20 by a fourth transfer conductor 70. The ECU 23 communicates with a first pressure warning switch 51 by a fifth transfer conductor 67 and a second pressure warning switch 37 by a sixth transfer conductor 69, a first speed sensor 55 by a seventh transfer conductor 68 and a second speed sensor 49 by a eighth transfer conductor 75.

Figure 3:
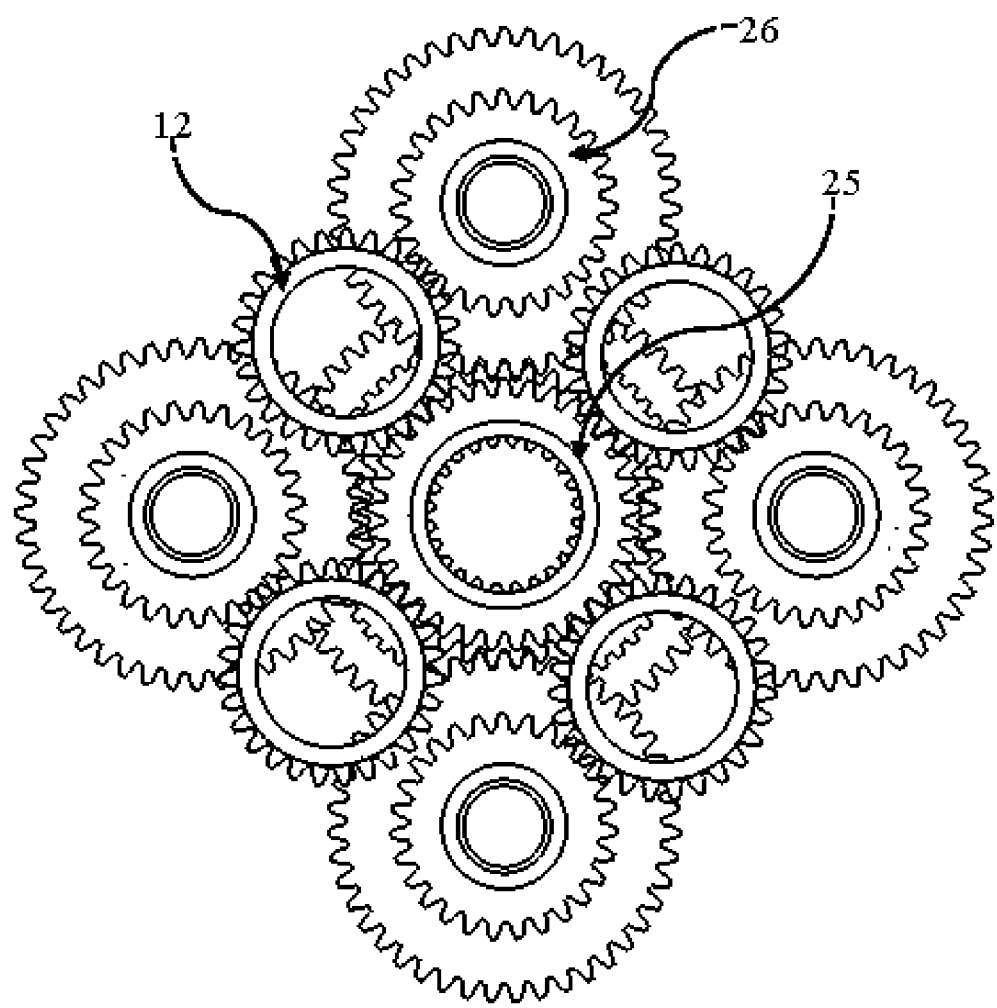
FIG. 3 is a partial sectional view showing the base sun gear, idler planet gears and base planet gears in FIG. 1 and FIG. 2.

Power from the electric motor 24 with a rotor shaft 47 is introduced into the two-speed transaxle 10 through the connection of the input shaft 11 with the base epicylic gear set 71. With reference to FIGS. 2 and 3, the base epicylic gear set 71 includes a base sun gear 25 and a plurality of base planet gears 26; a common planet gear carrier 76 rotatably supports a plurality of idler planet gears 12. The base sun gear 25 can be rotationally fixed to or formed on the input shaft 11. The common planet carrier 76 is hollow allowing the input shaft 11 to pass through its center from the base sun gear 25 to the rotor sleeve shaft 47. The plurality of idler planet gears 12 are each configured to intermesh with both the base sun gear 25 and the plurality of base planet gears 26.

Figure 4:
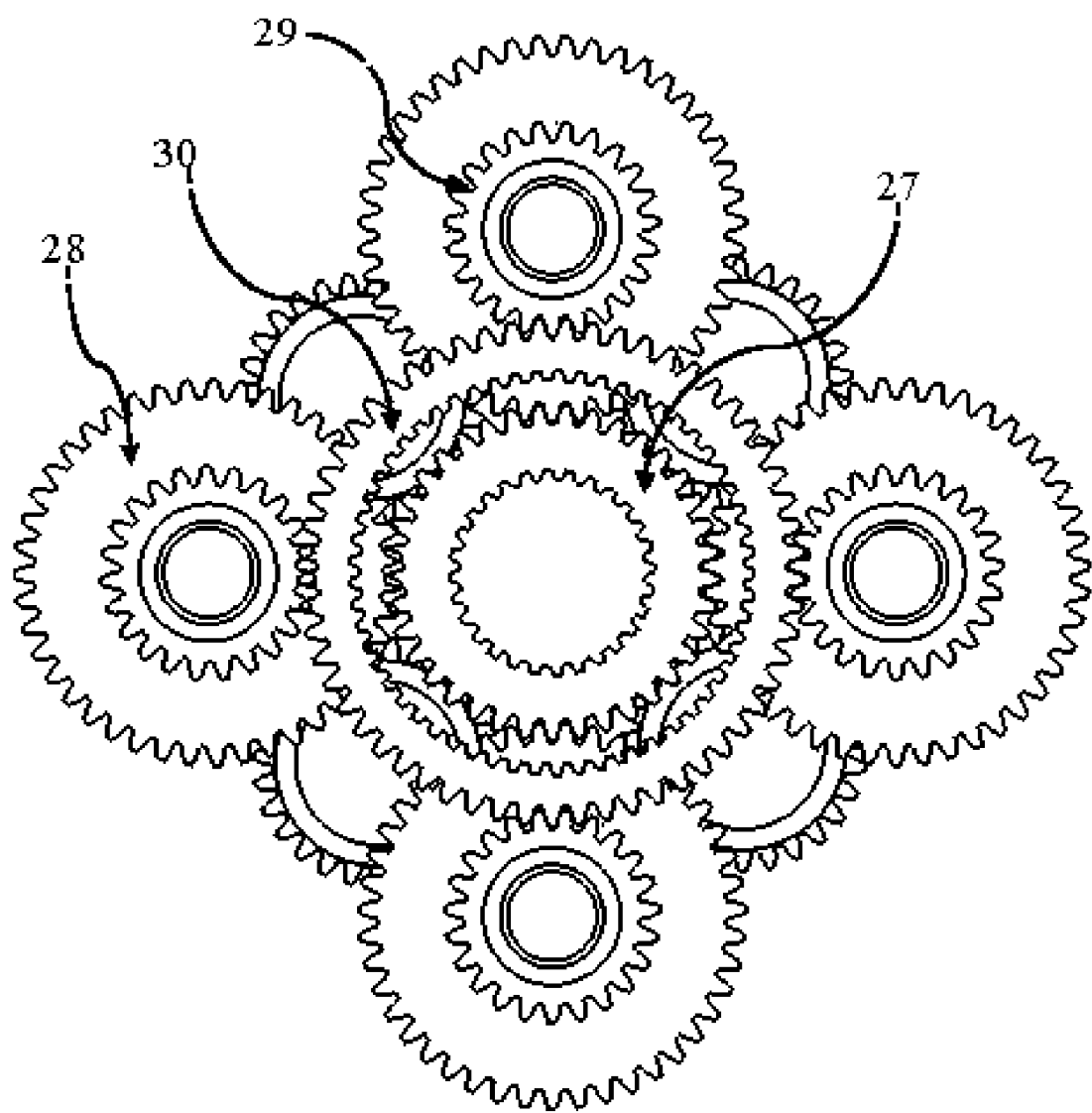
FIG. 4 is a partial sectional view showing the first sun gear, the second gear, the first planet gears and the second planet gears in FIG. 1 and FIG. 2.
Figure 5:
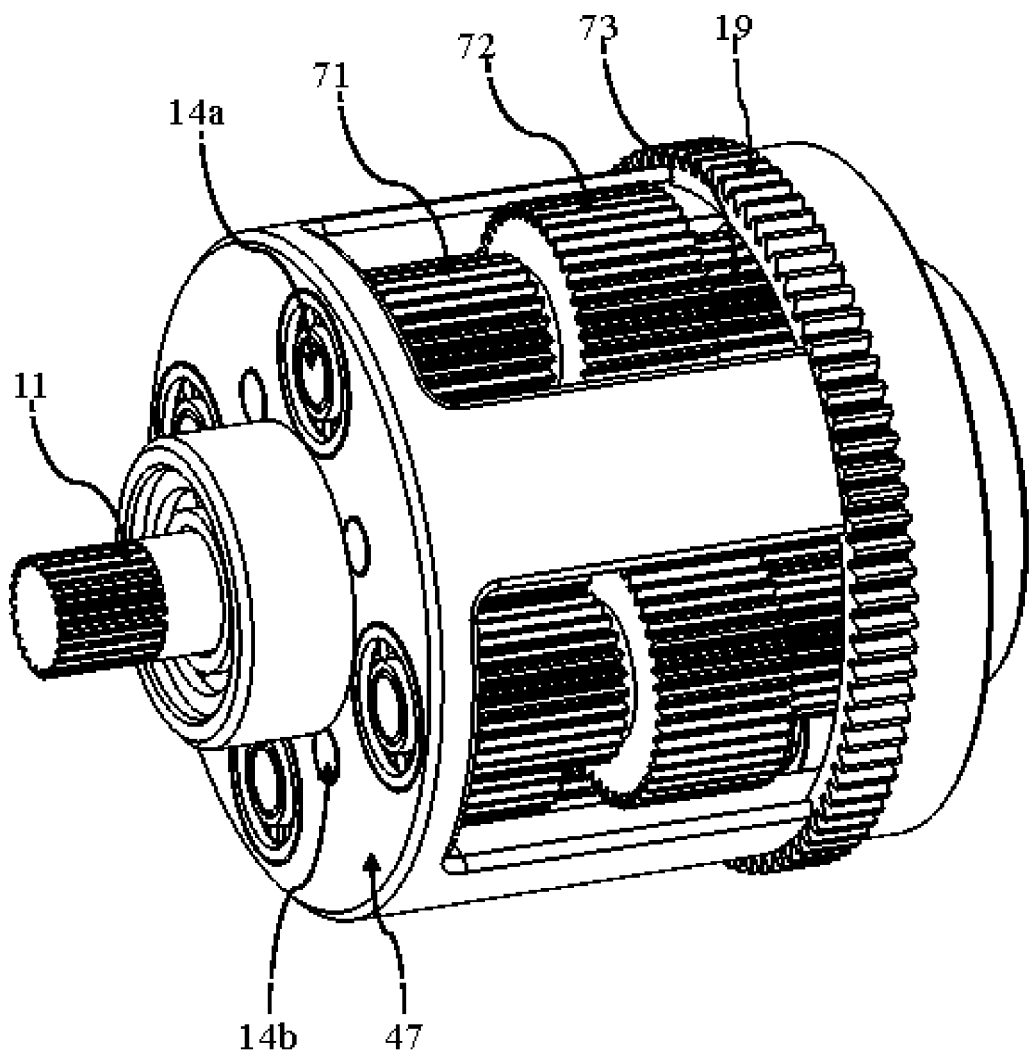
FIG. 5 is a partial sectional view showing the common planet carrier and common planet shafts in FIG. 1 and FIG. 2.

With reference to FIGS. 2 and 4, a first epicylic gear set 73 includes a first sun gear 30; the common planet gear carrier 76 rotatably supports a plurality of first planet gears 29. The plurality of first planet gears 29 is in continuous meshing engagement with the first sun gear 30. The first sun gear 30 is connected to an one-way overrunning clutch 63 that can be rotationally fixed to or formed on an inner race 15 of the one-way overrunning clutch 63, whose outer race 64 is secured against rotation to the transaxle casing. The two-speed transaxle 10 produces its first forward speed ratio when a first caliper brake system and a second caliper brake system are disengaged and a one-way clutch connects the first sun gear 30 to the transaxle casing. The first sun gear 30 is also connected to a first dry disc 54, which is installed outside of the transaxle casing and operated to produce reverse drive, hill braking, low gear and regenerative braking. When the first dry brake disc 54 is stopped by a first right pad plate 56 and a first left pad plate 57, the first sun gear 30 is fixed to the transaxle casing against rotation.

A second epicylic gear set 72 includes a second sun gear 27; the common planet carrier 76 that rotatably supports a plurality of second planet gears 28. The plurality of second planet gears 28 is in continuous meshing engagement with the second sun gear 27. The second sun gear 27 is rotationally fixed to or formed on a second brake shaft 13, which is connected to a second dry brake disc 48. The second dry brake disc 48 is installed outside of the transaxle casing and operated to produce a second forward speed ratio for the two-speed transaxle. The second forward speed ratio results when the second dry brake disc brake 48 is stopped by a second right pad plate 44 and a second left pad plate 45, the second sun gear 27 is fixed to the transaxle casing against rotation.

With reference to FIGS. 2-5, the plurality of base planet gears 26, the plurality of second planet gears 28 and the plurality of first planet gears 29 are orderly rotationally fixed to or formed on planet shafts 14a that are supported on the common planet carrier 76.

A first stage reduction drive unit includes a first drive gear 19 in constant meshed engagement with a first driven gear 31 as well as a second stage reduction drive unit including a second drive gear 32 in constant meshed engagement with a third driven gear 33. The first drive gear 19 is fixed for rotation with the common planet carrier 76 providing power from the epicylic gear set. The first driven gear 31 and second drive gear 32 are fixed for rotation with a countershaft 16 rotatably supported by the two-speed transaxle casing. The second drive gear 32 is fixed via a spline connection for rotation with the countershaft 16 while the third driven gear 33 is fixed to a carrier of the differential assembly 74. The differential assembly 74 comprises a differential carrier, which is rotatingly driveable around its axis, as well as two side shafts 17, 18. The power from the electric motor 24 introduced into the differential assembly 74 by the third driven gear 33, which is transmitted by the two side shafts 17, 18 to the wheels 34, 35 of the vehicle.

A first caliper disc brake system is a fixed caliper architectures, which comprises the first dry brake disc 54, a first speed sensors 55 for watching state of the first dry brake disc 54, the first left pad plate 57, the first right pad plate 56, two pairs of first independent hydraulic pistons 61, 60 as well as two first calipers 62, 59. The first caliper disc brake system, as shown in FIGS. 1 and 2, the first left pad plate 57 and the first right pad plate 56 are pressed against the first dry brake disc 54 by two pairs of first independent hydraulic pistons 61, 60 inside the first calipers 62, 59, respectively, connected in parallel to the same pressure source from a hydraulic actuator cylinder 52 by using a first hydraulic circuit 58. The first calipers 62, 59 and the first dry brake disc 54 are mounted on outside of the two-speed transaxle casing.

A first shifting system comprises a first shifting electric motor 21, a first hydraulic actuator cylinder 52, the first pressure warning switch 51 as well as a first oil tank 50. The wall of the first hydraulic actuator cylinder is connected to the first oil tank 50 at the front of the first hydraulic actuator cylinder 52, and the openings to the first pressure warning switch 51 and the braking circuit 53 at the back of the first hydraulic actuator cylinder 52. The first hydraulic actuator cylinder 52 is mounted on outside of the two-speed transaxle casing or the vehicle floor. The first hydraulic actuator cylinder 52 is operated by the force applied by the first shifting electric motor 21 by driving an actuator screw; as soon as the first shifting electric motor 21 is returned the initial position, the piston of the first hydraulic actuator cylinder 52 returns to the initial position by means of a return spring and the actuator screw reversed, and the hydraulic pressure is set to zero. As the first independent hydraulic pistons 61, 60 are pulled away from the first dry brake disc 54 by the elastic force from the sealing ring, there are no friction between the first pad plates 56, 57 and the first dry brake disc 54.

A second caliper disc brake system is also a fixed caliper architectures, which comprises the second dry brake disc 48, the second speed sensors 49 for watching state of the second dry brake disc 48, the second left pad plate 45, the second right pad plate 44, two pairs of second independent hydraulic pistons 46, 43 as well as two second calipers 41, 42. The second caliper disc brake system, as shown in FIGS. 1 and 2, the second left pad plate 45 and the second right pad plate 44 are pressed against the second dry brake disc 48 by two pairs of second independent hydraulic pistons 46, 43 inside the second calipers 41, 42, respectively, connected in parallel to the same pressure source from a second hydraulic actuator cylinder 38 by using a second hydraulic circuit 40. The second calipers 46, 43 and the second dry brake disc 48 are mounted on outside of the two-speed transaxle casing.

A second shifting system comprises a second shifting electric motor 20, the second hydraulic actuator cylinder 38, a second pressure warning switch 37 as well as a second oil tank 36. The wall of the second hydraulic actuator cylinder 38 is connected to the second oil tank 36 at the front of the second hydraulic actuator cylinder 38, and the openings to the second pressure warning switch 37 and the braking circuit 39 at the back of the second hydraulic actuator cylinder 38. The second hydraulic actuator cylinder 38 is mounted on outside of the two-speed transaxle casing or the vehicle floor. The second hydraulic actuator cylinder 38 is operated by the force applied by the second shifting electric motor 20 by driving an actuator screw; as soon as the second shifting electric motor 20 is returned the initial position, the piston of the second hydraulic actuator cylinder 38 returns to the initial position by means of a return spring and the actuator screw reversed, and the hydraulic pressure is set to zero. As the second piston 46 and 43 are pulled away from the second dry brake disc 48 by the elastic force from the sealing ring, there are no friction between the second pad plates 44, 45 and the second dry brake disc 48.

Operation of the Exemplary Preferred Embodiment

The operator of the vehicle has three primary devices to control the two-speed transaxle 10. One of the primary control devices is a well-known drive range selector (not shown) that directs the ECU 23 to configure the transaxle for either the park, reverse, neutral, or forward drive range. The second and third primary control devices constitute an accelerator pedal (not shown) and a brake pedal (also not shown). The information obtained by the ECU 23 from these three primary control sources will hereinafter be referred to as the "operator demand". The ECU 23 also obtains information from both the first and second shifting electric motor 21 and 20, respectively, the first and second pressure warning switch 51 and 37, respectively, the electric motor 24 and the electric storage device 22. In response to an operator's action, the ECU 23 determines what is required and then manipulates the selectively operated components of the two-speed transaxle 10 appropriately to respond to the operator demand.

For example, in the exemplary embodiment shown in FIG. 2, when the operator selects a drive range and manipulates either the accelerator pedal or the brake pedal, the ECU 23 thereby determines if the vehicle should accelerate or decelerate. The ECU 23 also monitors the state of the power sources, and determines the output speed from the transaxle required to effect the desired rate of acceleration or deceleration. Under the direction of the ECU 23, the transaxle is capable of providing a range of output speeds from slow to fast in order to meet the acceleration and deceleration demands.

In order to provide a full explanation as to the operation of a transaxle embodying the concepts of the invention, a description of the operational modes employed to achieve the output speeds necessary to meet the operator demand under various operating conditions shall be provided with respect to the first of the preferred embodiments. Those operating conditions are: whether the vehicle is to accelerate to, or hold, a desired speed; whether the vehicle is to decelerate; whether the vehicle is to reverse. As such, the ECU 23 constantly reads the operator demand in conjunction with the other information that expresses the operational state of the vehicle, including the power sources, and responds accordingly. The following descriptions describe various operational states of the two-speed transaxle identified by the numeral 10. Once the overall concept as to how this preferred embodiment operates is understood, those concepts shall likewise apply to the several alternative embodiments subsequently described herein.

As will become apparent as the detailed description proceeds, the two-speed transaxle 10 is a two-speed, automatic, shifting by dry disc brakes, driven by the electric motors, transaxle. In other words, the two side shafts 17, 18 receive and provide power through two distinct gear trains with the two-speed transaxle 10. A first gear train exists when the base sun gear 25 is driven by the electric motor 24, as occurs when the first sun gear 30 is fixed to the transaxle casing with one-way clutch or the first dry brake disc 54. A second gear train exists when the base sun gear 25 also is driven by the electric motor 24, as occurs when the second sun gear 27 is fixed to the transaxle casing with the second dry brake disc 48.

These two gear trains can be configured with the ECU 23 to provide a range of output speeds from relatively slow to relatively fast within each gear train of operation. This combination of two speeds with a slow to fast output speed range in each speed allows the two-speed transaxle 10 to propel a vehicle from a stopped condition to highway speeds and meet the other objects of the present invention. Additionally, the ECU 23 coordinates operation of the two-speed transaxle 10 so as to allow synchronized shifts between the first gear train and the second gear train.

There are four modes for the two-speed transaxle 10 that provides power to the electric vehicle, i.e. a first forward ratio drive, a second forward ratio drive, a reverse drive and a deceleration regenerative operation.

In the operating condition defined by having electric storage device 22 be the sole source of the driving power, and when the ECU 23 has determined that the operator desires to accelerate to or maintain a desired vehicle speed, the ECU 23 simultaneously employs the first and second gear trains to effect slow output speeds and thereafter transfers to a second gear train to provide the fast output speed.

I. The First Forward Ratio Drive.

The ECU 23 controls the first and second shifting electric motor 21 and 20 to remain the initial positions, respectively, i.e. there are no any pressure is used to push the first hydraulic pistons 60, 61 and the second hydraulic pistons 43, 46 to move forward. The clearance is kept up between the first pad plates 56, 57 and the first dry brake disc 54. The clearance is also kept up between the second pad plates 44, 45 and the second dry brake disc 48.

To produce the first gear train, i.e. the first forward ratio drive, neither the first caliper disc brake system nor the second caliper disc brake system is engaged. Instead, inner race 15 of overrunning clutch 63 transmits torque to the outer race 64, thus fixing the first sun gear member 30 against rotation by the connection between the inner race and the outer race to the two-speed transaxle casing. The common planet carrier 76, the driven member of the base-first epicylic gear set, transmits the power from the electric motor 24 to the first drive gear 19. The power from the first drive gear 19 introduces into the differential assembly 74 by the two reduction drive units. A first torque delivery path for the first ratio drive operation includes the base sun gear 25, which is driven by the electric motor 24 through the input shaft 11; the plurality of idler planet gears 12; the plurality of base planet gears 26; the plurality of the first planet gears 29; planet shafts 14a; the first sun gear 30 fixed by the one-way overrunning clutch 63 which provides the torque reaction point for the transaxle in low gear; the common planet carrier 76, which drives the first drive gear 19; the first driven gear 31, which is driven by the first drive gear 19; the second drive gear 32, which is driven by the first driven gear 31 through the countershaft 16; the third driven gear 33, which is driven by the second drive gear 32; the third driven gear 33 drives the differential assembly 74 to transmit the power to the side shafts 17,18. The second sun gear 27 drives the dry brake disc 48 to freely rotatably around the second brake shaft 13 without friction.

Based on size constrains and the epicylic gear set, which are well known in the art, the speed reduction and torque increase ratios through the first gear train of the two-speed transaxle 10 are selected based on gear teeth ratios:

$$\left(1 + \frac{Z26 \cdot Z30}{Z25 \cdot Z29}\right)\frac{Z31 \cdot Z33}{Z19 \cdot Z32}$$

Wherein:
Z26 is the number of gear teeth of the base planet gear 26.
Z30 is the number of gear teeth of the first sun gear 30.
Z25 is the number of gear teeth of the base sun gear 25.
Z29 is the number of gear teeth of the first planet gear 29.
Z19 is the number of gear teeth of the first drive gear 19.
Z31 is the number of gear teeth of the first driven gear 31.
Z32 is the number of gear teeth of the second drive gear 32.
Z33 is the number of gear teeth of the third driven gear 33.

II. The Second Forward Ratio Drive.

The ECU 23 directs the second shifting electric motor 20 to push the second hydraulic actuator cylinder 38 through an actuator screw; thereafter the high pressure oil feeds into the cavities formed between the second hydraulic pistons 43, 46 and the second calipers 41, 42 through the pipe circuit 39. The second hydraulic pistons 43, 46 are operated by the fluid pressure, which drives the second pad plates 44, 45 to fix the dry brake disc 48. Therefore, the second sun gear member 27 is gently fixed to the two-speed transaxle casing.

To produce the second gear train, i.e. the second or high-speed ratio results when the second caliper disc brake system is engaged and the first caliper disc brake system is disengaged. When this occurs, overrunning clutch 63 does not lock the first sun gear 30 to the two-speed transaxle casing. A second torque delivery path for the second ratio drive operation includes the base sun gear 25 driven by the electric motor 24 through the input shaft 11, the plurality of idler planet gears 12, the plurality of base planet gears 26, the plurality of the second planet gears 28, planet shafts 14a, the second sun gear 27 fixed by the second caliper disc brake system which provides the torque reaction point for the transaxle in high gear, the common planet carrier 76 for driving the first drive gear 19, the first driven gear 31 driven by the first drive gear 19, the second drive gear 32 driven by the first driven gear 31 through the countershaft 16, the third driven gear 33 driven by the second drive gear 32, and the third driven gear 33 for driving the differential assembly 74 to transmit the power to the side shafts 17,18. The first sun gear 30 drives the dry brake disc 54 to freely rotatably around the inner race 15 of the one-way overrunning clutch 63 without friction.

Based on size constrains and the epicylic gear set, which are well known in the art, the speed reduction and torque increase ratios through the first gear train of the two-speed transaxle 10 are selected based on gear teeth ratios:

$$\left(1 + \frac{Z26 \cdot Z27}{Z25 \cdot Z28}\right)\frac{Z31 \cdot Z33}{Z19 \cdot Z32}$$

Wherein:
Z26 is the number of gear teeth of the base planet gear 26.
Z27 is the number of gear teeth of the second sun gear 27.
Z25 is the number of gear teeth of the base sun gear 25.
Z28 is the number of gear teeth of the first planet gear 28.
Z19 is the number of gear teeth of the first drive gear 19.
Z31 is the number of gear teeth of the first driven gear 31.
Z32 is the number of gear teeth of the second drive gear 32.
Z33 is the number of gear teeth of the third driven gear 33.

III. The Reverse Drive.

The ECU 23 directs the first shifting electric motor 21 to push the first hydraulic actuator cylinder 52 through an actuator screw; thereafter the high pressure oil feeds into the cavities formed between the first hydraulic pistons 61, 60 and the first calipers 62, 59 through the pipe circuit 53. The first hydraulic pistons 61, 60 are operated by the fluid pressure, which drives the first pad plates 56, 57 to fix the dry brake disc 54. Therefore, the first sun gear member 30 is fixed to the two-speed transaxle casing.

The reverse drive results when the rotational direction of input shaft 11 is reversed, e.g. by changing the rotation of the electric motor 24 power source, and the first caliper brake system is applied. When the direction of the input shaft is reversed, one-way clutch 63 overruns but the first sun gear 30 remained fixed against rotation because the first caliper brake system is engaged and fixes the first sun gear 30 to the two-speed transaxle casing. In reverse drive operation, the torque delivery path is identical to that for the first ratio forward speed drive previously described. The electric motor 24 drives the input shaft 11 through the motor rotor shaft 47, the input shaft 11 transmits the power to the base sun gear 25, the plurality of planet gears 12, 26, 29 and the first sun gear 30 which provides the torque reaction point for the two-speed transaxle 10 in reverse gear drive the common planet carrier 76 to drive the first drive gear 19. Output power is transmitted by the first driven gear 31, the second drive gear 32 and the third driven gear 33, which transmits power to the side shafts 17, 18 through the differential assembly 74.

Based on size constrains and the epicylic gear set, which are well known in the art, the speed reduction and torque increase ratios through the first gear train of the two-speed transaxle 10 are selected based on gear teeth ratios:

$$\left(1 + \frac{Z26 \cdot Z30}{Z25 \cdot Z29}\right)\frac{Z31 \cdot Z33}{Z19 \cdot Z32}$$

Wherein:
Z26 is the number of gear teeth of the base planet gear 26.
Z30 is the number of gear teeth of the first sun gear 30.
Z25 is the number of gear teeth of the base sun gear 25.
Z29 is the number of gear teeth of the first planet gear 29.
Z19 is the number of gear teeth of the first drive gear 19.
Z31 is the number of gear teeth of the first driven gear 31.
Z32 is the number of gear teeth of the second drive gear 32.
Z33 is the number of gear teeth of the third driven gear 33.

IV. The Deceleration and Regenerative Operation: The Dynamic Energy of the Electric Vehicle is Used to Charge the Electric Storage Device 22.

In the operating condition defined by having the dynamic energy of the moving electric vehicle fed back solely for the purpose of charging the electric storage device 22, and when the ECU 23 has determined that the operator desires to decelerate, the ECU 23 directs operation in both the first gear ratio drive and the second gear ratio drive when the fed back speeds are in the second feed-back speed range and direct the operation occur solely in the first gear ratio drive when the feed-back speeds fall in the first feed-back speed range.

For operation in the first speed ratio, the ECU 23 directs the engagement or application of the first caliper brake systems, while directing that the second caliper brake system be disengaged or released. To effect the transmission whereby the two-speed transaxle 10 operates solely in the first gear ratio, the ECU 23 simply effects disengagement of the second gear ratio. As such, the first caliper brake system remains engaged.

The ECU 23 directs the first shifting electric motor 21 to push the first hydraulic actuator cylinder 52 through an actuator screw; thereafter the high pressure oil feeds into the cavities formed between the first hydraulic pistons 61, 60 and the first calipers 62, 59 through the pipe circuit 53. The first hydraulic pistons 61, 60 are operated by the fluid pressure, which drives the first pad plates 56, 57 to fix the dry brake disc 54. Therefore, the first sun gear member 30 is gently fixed to the two-speed transaxle casing. When the pressure has reached its maximum value, the first pressure warning switch 51 produces a signal. The ECU 23 controllers that receive the signal, process information, and produce output signals to control the first shifting electric motor 21. As the ECU 23 directs the first shifting electric motor 21 to stop and to lock the actuator screw, the pressure is kept up.

Under the condition that the first gear ratio is selected, feed-back power is received from the side shafts 17, 18. A dynamic energy delivery path for the first ratio drive operation includes the side shafts 17, 18 for driving the differential assembly 74 to transmit the dynamic energy to the third driven gear 33, the second drive gear 32 driven by the third driven gear 33, the first driven gear 31 driven by the second drive 32 through the countershaft 16, the first drive gear 19 driven by the first driven gear 31, the first drive gear 19 for driving the common planet carrier 76, the first sun gear member 30 fixed by the first caliper disc brake system which provides the torque reaction point for the transaxle in the first gear ratio (regenerative mode); planet shafts 14a, the plurality of the first planet gears 29, the plurality of base planet gears 26, the plurality of idler planet gears 12, and the electric motor 24 driven by the base sun gear 25 through the input shaft 11.

For operation in the second speed ratio, the ECU 23 directs the engagement or application of the second caliper brake systems, while directing that the first caliper brake system be disengaged or released. To effect the transmission whereby the two-speed transaxle 10 operates solely in the second gear ratio, the ECU 23 simply effects disengagement of the first gear ratio. As such, the second caliper brake system remains engaged.

The ECU 23 directs the second shifting electric motor 20 to push the second hydraulic actuator cylinder 38 through an actuator screw; thereafter the high pressure oil feeds into the cavities formed between the second hydraulic pistons 43, 46 and the second calipers 41, 42 through the pipe circuit 39. The second hydraulic pistons 43, 46 are operated by the fluid pressure, which drives the second pad plates 44, 45 to fix the dry brake disc 48. Therefore, the second sun gear member 27 is gently fixed to the two-speed transaxle casing. When the pressure has reached its maximum value, the second pressure warning switch 37 produces a signal. The ECU 23 controllers that receive the signal, process information, and produce output signals to control the first shifting electric motor 20. As the ECU 23 directs the second shifting electric motor 20 to stop and to lock the actuator screw, the pressure is kept up.

Under the condition that the second gear ratio is selected, feed-back power is received from the side shafts 17, 18. The dynamic energy delivery path for the second ratio drive operation includes the side shafts 17, 18 for driving the differential assembly 74 to transmit the dynamic energy to the third driven gear 33, the second drive gear 32 driven by the third driven gear 33, the first driven gear 31 driven by the second drive 32 through the countershaft 16, the first drive gear 19 driven by the first driven gear 31, the first drive gear 19 for driving the common planet carrier 76, the second sun gear 27 fixed by the second caliper disc brake system which provides the torque reaction point for the transaxle in the second gear ratio (regenerative mode), planet shafts 14a, the plurality of the second planet gears 28, the plurality of base planet gears 26, the plurality of idler planet gears 12, and the electric motor 24 driven by the base sun gear 25 through the input shaft 11.

Description of a Second Alternative Embodiment

Figure 6:
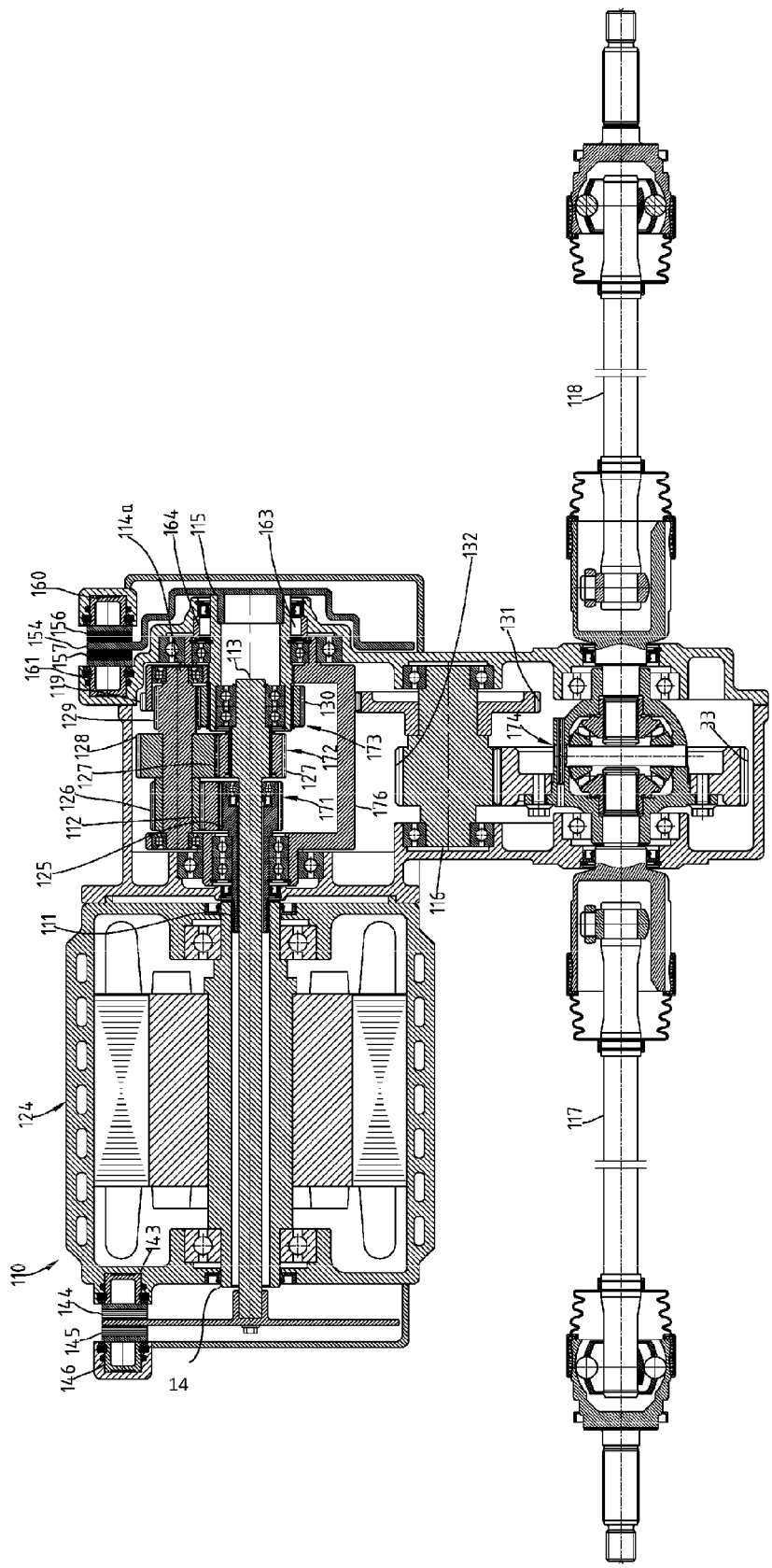
FIG. 6 is a diagrammatic, longitudinal cross section view of a two-speed transaxle according to a second representative preferred embodiment of the invention.
Figure 7:
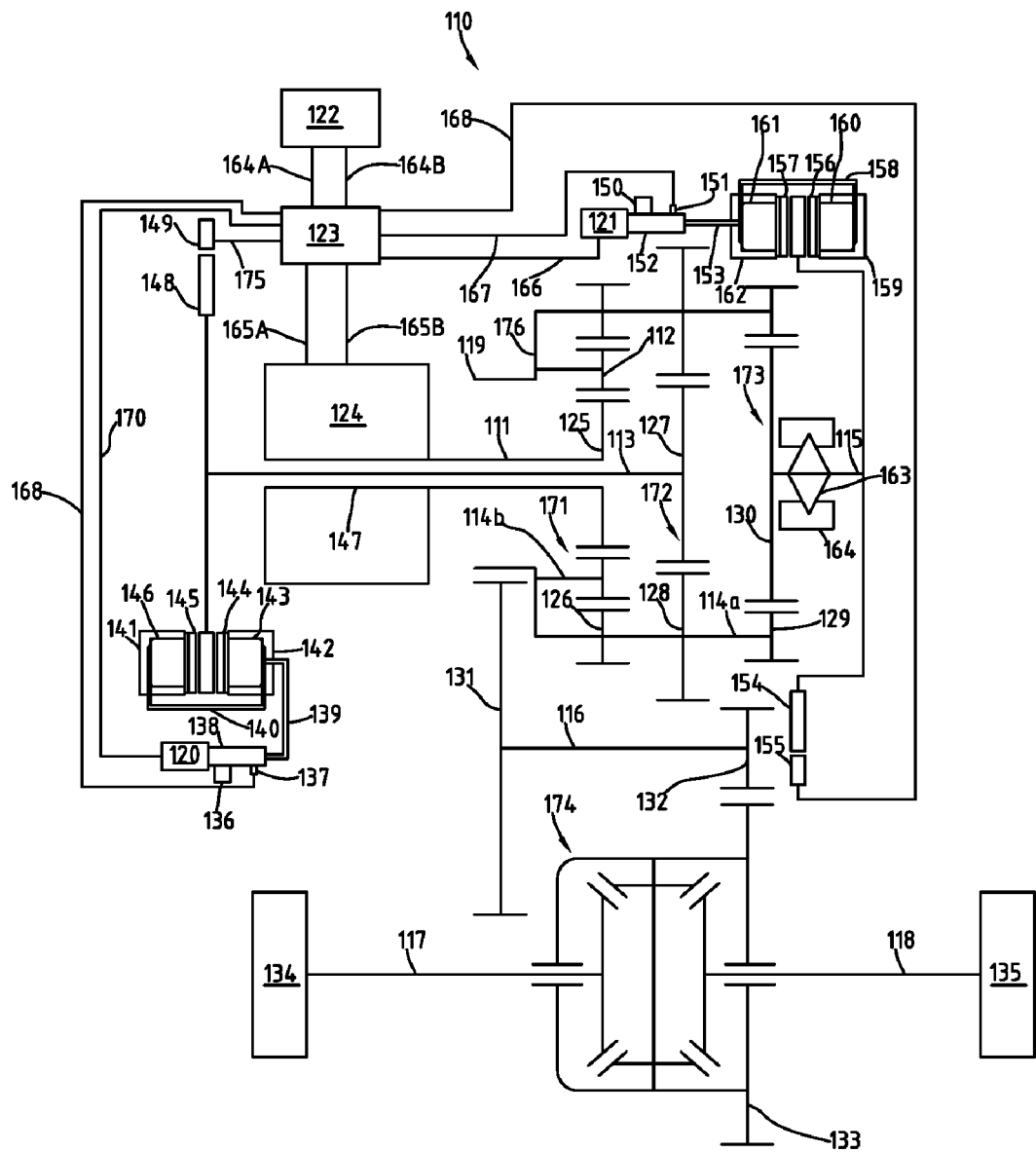
FIG. 7 is a schematic representation of the two-speed transaxle depicted in FIG. 6.

A second alternative and also a highly preferred form of a two-speed transaxle embodying the concepts of the present invention, is designated generally by the numeral 110 on the FIGS. 6 and 7. With particular reference to FIG. 7, it well be observed that the two-speed transaxle 110 includes an electric motor 124, an input shaft 111, a base epicylic gear set 171, a first epicylic gear set 173, a second epicylic gear set 172, a common planet carrier and a first and second caliper brake systems. The two-speed transaxle 110 also includes a first drive gear 119, a first driven gear 131, a second drive gear 132, a third driven gear 133 and a differential assembly 174.

The two-speed transaxle 110 is utilized in a vehicle (not shown), such as an electric vehicle or hybrid vehicle, that is driven by an operator. The two-speed transaxle 110 receives power from an electric storage device 122. The two-speed transaxle 110 can, as will be hereinafter more fully discussed, also received feed-back power form the vehicle axles when the vehicle is decelerating. In the second embodiment, the electric motor 124 is a variable-speed alternating current motor, and the electric storage device 122 is one or more batteries. It will be noted that other electric storage devices which have the ability to store electric power and dispense electric power may be used in place of the batteries without altering the concepts of the present invention. The electric storage device 122 communicates with an electrical control unit (ECU) 123 by two first transfer conductors 164A, 164B. The ECU 123 communicates with the electric motor 124 by two second transfer conductors 165A and 165B, and the ECU 123 similarly communicates with a first shifting electric motor 121 by a first transfer conductor 166 and a second shifting electric motor 120 by a second transfer conductor 170. The ECU 123 communicates with a first pressure warning switch 151 by a third transfer conductor 167, a second pressure warning switch 137 by a fourth transfer conductor 169, a first speed sensor 155 by a fifth transfer conductor 168 and a second speed sensor 149 by a sixth transfer conductor 175.

Power from the electric motor 124 with a rotor shaft 147 is introduced into the two-speed transaxle 110 through the connection of the input shaft 111 with the base epicylic gear set 171. With reference to FIG. 7, the base epicylic gear set 171 includes a base sun gear member 125, a common planet gear carrier member 176 that rotatably supports a plurality of idler planet gears 112 and a plurality of base planet gears 126. The base sun gear 125 is rotationally fixed to or formed on the input shaft 111. The common planet carrier 176 is hollow allowing the input shaft 111 to pass through its center from the base sun gear 125 to the rotor shaft 147. The rotor shaft 147 is hollow allowing a second brake shaft 113 to pass through its center from the second epicylic gear set 172 to a second sun gear 127. The input shaft 111 is also hollow allowing the second brake shaft 113 to pass through its center. The plurality of idler planet gears 112 are each configured to intermesh with both the base sun gear 125 and the plurality of base planet gears 126.

The first epicylic gear set 173 includes a first sun gear 130, the common planet carrier 176 that rotatably supports a plurality of first planet gears 129. The plurality of first planet gears 129 is in continuous meshing engagement with the first sun gear 130. The first sun gear 130 is connected to an one-way overrunning clutch 163 that may be rotationally fixed to or formed on an inner race 115 of the overrunning or one-way clutch, whose outer race 164 is secured against rotation to the transaxle casing. The two-speed transaxle 110 produces its first forward speed ratio when a first hydraulic brake system and a second hydraulic brake system are disengaged and a one-way clutch connects the first sun gear 130 to the transaxle casing. The first sun gear 130 is also connected to a first dry brake disc 154, which is mounted on the right back-end of the two-speed transaxle 110 and operated to produce reverse drive, hill braking, low gear and regenerative braking. When the first dry brake disc 154 is stopped by a first right pad plate 156 and a first left pad plate 157, the first sun gear 130 is fixed to the transaxle casing against rotation. The second epicylic gear set 172 includes a second sun gear 127 and a common planet carrier 176 that rotatably supports a plurality of second planet gears 128. The plurality of second planet gears 128 is in continuous meshing engagement with the second sun gear 127. The second sun gear 127 may be rotationally fixed to or formed on the second brake shaft 113, which is connected to a second friction dry brake disc 148. A second dry brake disc 148 is mounted on the left back-end of the electric motor 124 and operated to produce a second forward speed ratio for the two-speed transaxle 110. The second forward speed ratio results when the second disc brake 148 is stopped by a second right pad plate 144 and a second left pad plate 145, the second sun gear 127 is fixed to the electric motor 124 casing against rotation.

With reference to FIGS. 6 and 7, the plurality of base planet gears 126, the plurality of second planet gears 128 and the plurality of first planet gears 129 may be orderly rotationally fixed to or formed on planet shafts 114a that are supported on the common planet carrier 176.

A first stage reduction drive unit includes a first drive gear 119 in constant meshed engagement with a first driven gear 131 as well as a second stage reduction drive unit including a second drive gear 132 in constant meshed engagement with a third driven gear 133. First drive gear 119 is fixed for rotation with the common planet carrier 176 providing power from the epicylic gear set. The first driven gear 131 and second drive gear 132 are fixed for rotation with a countershaft 116 rotatably supported by the two-speed transaxle 110 casing. The second drive gear 132 is fixed via a spline connection for rotation with the countershaft 116 while the third driven gear 133 is fixed to the carrier of the differential assembly 174. The differential assembly 174 comprises a differential carrier, which is rotatingly driveable around its axis, as well as two side shafts 117, 118. The power from the electric motor 124 introduced into the differential assembly 174 by the third driven gear 133, which is transmitted by the two side shaft 117, 118 to two wheels 134, 135 of the vehicle.

A first caliper disc brake system is a fixed caliper architectures comprising a first dry brake disc 154, the first speed sensors 155 for watching state of the first dry brake disc 154, the first left pad plate 157, the first right pad plate 156, two pairs of first independent hydraulic pistons 161, 160 and two first calipers 162, 159. The first caliper disc brake system, as shown in FIGS. 6 and 7, the first left pad plate 157 and the first right pad plate 156 are pressed against the first dry brake disc 154 by two pairs of first independent hydraulic pistons 161, 160 inside the first calipers 162, 159, respectively, connected in parallel to the same pressure source from the first hydraulic actuator cylinder 152 by using a first hydraulic circuit 158. The first calipers 162, 159 and the first dry brake disc 154 are mounted on the right back-end of the two-speed transaxle 110 casing.

A first shifting system comprises the first shifting electric motor 121, the first hydraulic actuator cylinder 152, the first pressure warning switch 151 as well as a first oil tank 150. The wall of the first hydraulic actuator cylinder 152 is connected to the first oil tank 150 at the front of the first hydraulic actuator cylinder 152, and the openings to the first pressure warning switch 151 and the braking circuit 153 at the back of the first hydraulic actuator cylinder 152. The first hydraulic actuator cylinder 152 is mounted on outside of the two-speed transaxle casing or the vehicle floor. The first hydraulic actuator cylinder 152 is operated by the force applied by the first shifting electric motor 121 by driving an actuator screw; as soon as the first shifting electric motor 121 is returned the initial position, the piston of the first hydraulic actuator cylinder 152 returns to the initial position by means of a return spring and the actuator screw reversed, and the hydraulic pressure is set to zero. As the first piston 161, 160 are pulled away from the first dry brake disc 154 by the elastic force from the sealing ring, there are no friction between the first pad plates 156, 157 and the first dry brake disc 154.

A second caliper disc brake system is also a fixed caliper architectures comprising a second dry brake disc 148, the second speed sensors 149 for watching state of the second dry brake disc 148, the second left pad plate 145, the second right pad plate 144, two pairs of second independent hydraulic pistons 146, 143 as well as the second calipers 141, 142. The second caliper disc brake system, as shown in FIGS. 6 and 7, the second left pad plate 145 and the second right pad plate 144 are pressed against the second dry brake disc 148 by two pairs of second independent hydraulic pistons 146, 143 inside the first calipers 141, 142, respectively, connected in parallel to the same pressure source from a second hydraulic actuator cylinder 138 by using a second hydraulic circuit 140. The second calipers 146, 143 and the second dry brake disc 148 are mounted on the left back-end of the electric motor 124 casing.

A second shifting system comprises the second shifting electric motor 120, the second hydraulic actuator cylinder 138, the second pressure warning switch 137 and a second oil tank 136. The wall of the second hydraulic actuator cylinder 138 is connected to the second oil tank 136 at the front of the second hydraulic actuator cylinder 138, and the openings to the second pressure warning switch 137 and a braking circuit 139 at the back of the second hydraulic actuator cylinder 138. The second hydraulic actuator cylinder 138 is mounted on outside of the two-speed transaxle 110 casing or the electric motor 124 casing. The second hydraulic actuator cylinder 138 is operated by the force applied by the second shifting electric motor 120 by driving an actuator screw; as soon as the second shifting electric motor 120 is returned the initial position, the piston of the second hydraulic actuator cylinder 138 returns to the initial position by means of a return spring and the actuator screw reversed, and the hydraulic pressure is set to zero. As the second piston 146 and 143 are pulled away from the second dry brake disc 148 by the elastic force from the sealing ring, there are no friction between the second pad plates 144, 145 and the second dry brake disc 148.

Description of a Third Alternative Embodiment

Figure 8:
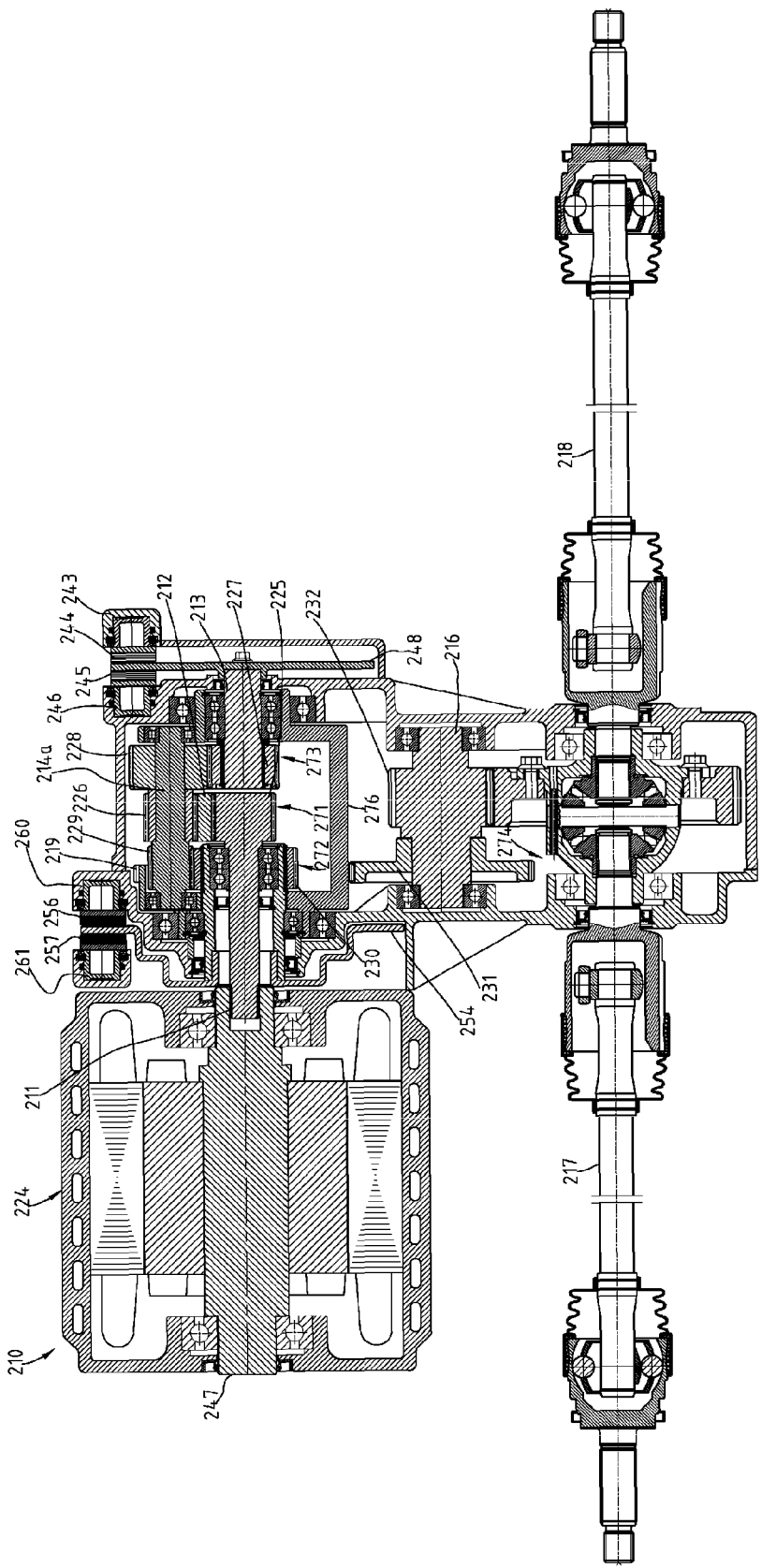
FIG. 8 is a diagrammatic, longitudinal cross section view of a two-speed transaxle according to a third representative preferred embodiment of the present invention.
Figure 9:
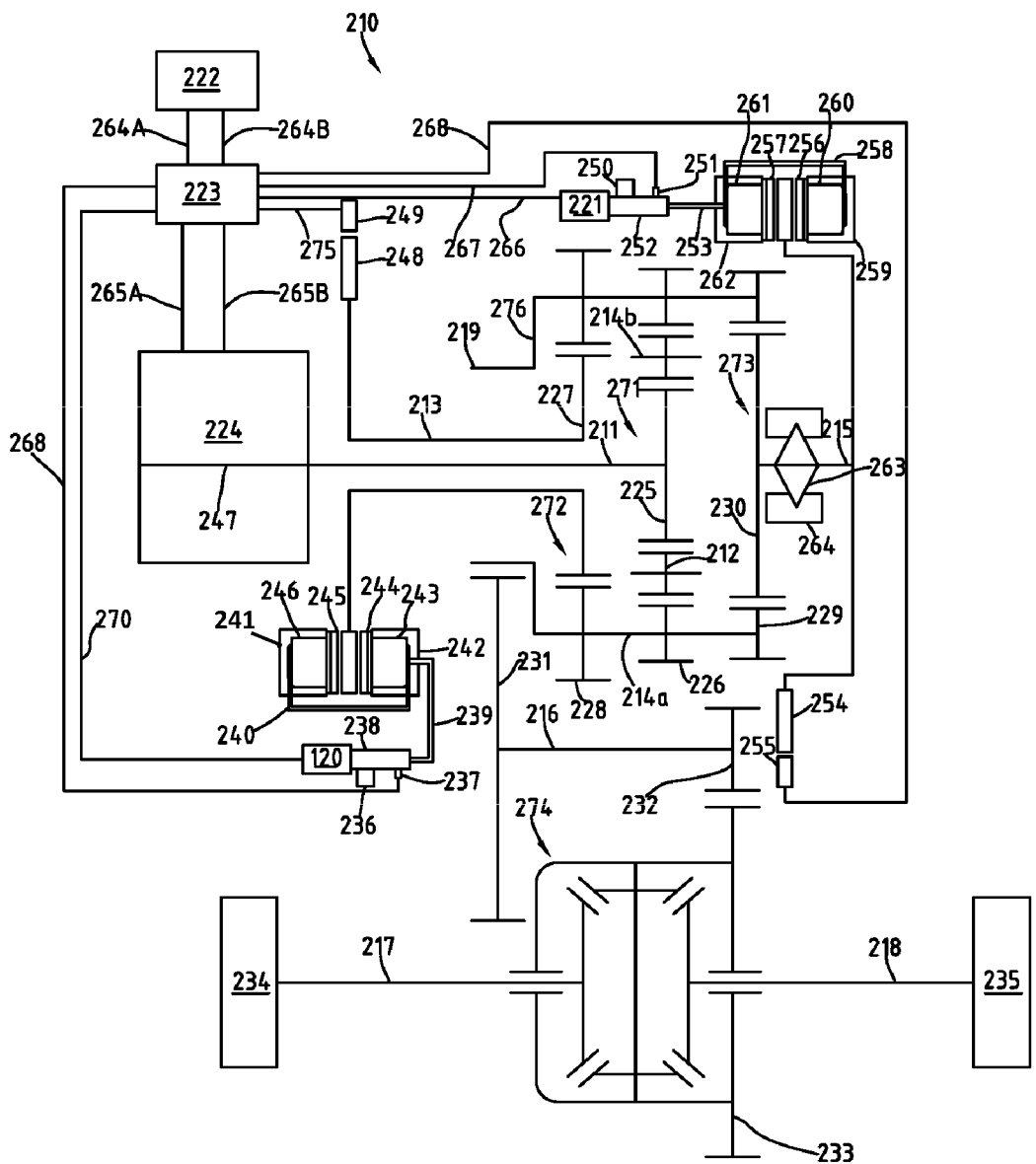
FIG. 9 is a schematic representation of the two-speed transaxle depicted in FIG. 8.

A second alternative and also a highly preferred form of a two-speed transaxle embodying the concepts of the present invention, is designated generally by the numeral 210 on the FIGS. 8 and 9. With particular reference to FIG. 9, It well be observed that the two-speed transaxle 210 includes an electric motor 224, an input shaft 211, a base epicylic gear set 271, a first epicylic gear set 273, a second epicylic gear set 272, a common planet carrier and a first and second caliper brake systems. The two-speed transaxle 210 includes a first drive gear 219, a first driven gear 231, a second drive gear 232, a third driven gear 233 and a differential assembly 274.

The two-speed transaxle 210 is utilized in a vehicle (not shown), such as an electric vehicle or hybrid vehicle, that is driven by an operator. The two-speed transaxle 210 receives power from an electric storage device 222. The two-speed transaxle 210 can, as will be hereinafter more fully discussed, also received feed-back power form the vehicle axles when the vehicle is decelerating. In this exemplary embodiment, the electric motor 224 is a variable-speed alternating current motor, and the electric storage device 222 is one or more batteries. It will be noted that other electric storage devices which have the ability to store electric power and dispense electric power can be used in place of the batteries without altering the concepts of the present invention. The electric storage device 222 communicates with an electrical control unit (ECU) 223 by the transfer two first conductors 264A and 264B. The ECU 223 communicates with the electric motor 224 by two second transfer conductors 265A and 265B, and the ECU 223 similarly communicates with the first shifting electric motor 221 by two third transfer conductors 266 and the second shifting electric motor 220 by a fourth transfer conductor 270. The ECU 223 communicates with a first pressure warning switch 251 by a fifth transfer conductor 267, a second pressure warning switch 237 by a sixth transfer conductor 269, a first speed sensor 255 by a seventh transfer conductor 268 and a second speed sensor 249 by a eighth transfer conductor 275.

Power from the electric motor 224 with a rotor shaft 247 is introduced into the two-speed transaxle 210 through the connection of the input shaft 211 with the base epicylic gear set 271. With reference to FIG. 9, the base epicylic gear set 271 includes a base sun gear 225, a common planet carrier 276 that rotatably supports a plurality of idler planet gears 212 and a plurality of base planet gears 226. The base sun gear 225 is rotationally fixed to or formed on the input shaft 211. The common planet carrier 276 is hollow allowing the input shaft 211 to pass through its center from the base sun gear 225 to the rotor shaft 247. The common planet carrier 276 is also hollow allowing a second brake shaft 213 to pass through its center from a second sun gear 227 to a second dry brake disc 248. The second brake shaft 213 is also hollow allowing the input shaft 211 to pass through its center from the base sun gear 225 to the electric motor rotor shaft 247. The plurality of idler planet gears 212 are each configured to intermesh with both the base sun gear member 225 and the plurality of base planet gears 226.

With reference to FIGS. 8 and 9, a plurality of second planet gears 228, the plurality of base planet gears 226 and the plurality of first planet gears 229 is orderly rotationally fixed to or formed on planet shafts 214a that are supported on the common planet carrier 276.

A first stage reduction drive unit includes a first drive gear 219 in constant meshed engagement with the first driven gear 231 as well as a second stage reduction drive unit including the second drive gear 232 in constant meshed engagement with the third driven gear 233. The first drive gear 219 is fixed for rotation with the common planet carrier 276 providing power from the epicylic gear set. The first driven gear 231 and second drive gear 232 are fixed for rotation with a countershaft 216 rotatably supported by the two-speed transaxle 210 casing. The second drive gear 232 is fixed via a spline connection for rotation with the countershaft 216 while the third driven gear 233 is fixed to the carrier of the differential assembly 274. The differential assembly 274 comprises a differential carrier, which is rotatingly driveable around its axis, as well as two side shafts 217, 218. The power from the electric motor 224 introduced into the differential assembly 274 by the second driven gear 233, which is transmitted by the two side shaft 217, 218 to two wheels 234, 235 of the vehicle.

A first caliper disc brake system is a fixed caliper architectures comprising a first dry brake disc 254, a first speed sensors 255 for watching state of the first dry brake disc 254, a first left pad plate 257, a first right pad plate 256, two pairs of first independent hydraulic pistons 261, 260 as well as the first calipers 262, 259. The first caliper disc brake system, as shown in FIGS. 8 and 9, the first left pad plate 257 and the first right pad plate 256 are pressed against the first dry brake disc 254 by two pairs of first independent hydraulic pistons 261, 260 inside the first calipers 262, 259, respectively, connected in parallel to the same pressure source from the first hydraulic actuator cylinder 252 by using a hydraulic circuit 258. The first calipers 262, 259 and the first dry brake disc 254 are mounted on the right back-end of the two-speed transaxle 210 casing.

A first shifting system comprises the first shifting electric motor 221, the first hydraulic actuator cylinder 252, the first pressure warning switch 251 and a first oil tank 250. The wall of the first hydraulic actuator cylinder 252 wall is connected to the first oil tank 250 at the front of the first hydraulic actuator cylinder 252, and the openings to the first pressure warning switch 251 and the braking circuit 253 at the back of the first hydraulic actuator cylinder 252. The first hydraulic actuator cylinder 252 is mounted on outside of the two-speed transaxle casing or the vehicle floor. The first hydraulic actuator cylinder 252 is operated by the force applied by the first shifting electric motor 221 by driving an actuator screw; as soon as the first shifting electric motor 221 is returned the initial position, the piston of the first hydraulic actuator cylinder 252 returns to the initial position by means of a return spring and the actuator screw reversed, and the hydraulic pressure is set to zero. As the first piston 261 and 260 are pulled away from the first dry brake disc 254 by the elastic force from the sealing ring, there are no friction between the first pad plates 256, 257 and the first dry brake disc 254.

A second caliper disc brake system is also a fixed caliper architectures comprising the second dry brake disc 248, the second speed sensors 249 for watching state of the second dry brake disc 248, the second left pad plate 245, the second right pad plate 244, two pairs of second independent hydraulic pistons 246, 243 as well as a second calipers 241, 242. The second caliper disc brake system, as shown in FIGS. 8 and 9, the second left pad plate 245 and the second right pad plate 244 are pressed against the second dry brake disc 248 by two pairs of second independent hydraulic pistons 246, 243 inside the second calipers 241, 242, respectively, connected in parallel to the same pressure source from the second hydraulic actuator cylinder 238 by using a second hydraulic circuit 240. The second calipers 246, 243 and the second dry brake disc 248 are mounted on the interspaces between the electric motor 224 casing and the transaxle casing.

A second shifting system comprises the second shifting electric motor 220, a second hydraulic actuator cylinder 238, the second pressure warning switch 237 as well as a second oil tank 236. The wall of the second hydraulic actuator cylinder 238 is connected to the second oil tank 236 at the front of the second hydraulic actuator cylinder 238, and the openings to the second pressure warning switch 237 and a braking circuit 239 at the back of the second hydraulic actuator cylinder 238. The second hydraulic actuator cylinder 238 is mounted on outside of the two-speed transaxle 210 casing or the electric motor 224 casing. The second hydraulic actuator cylinder 238 is operated by the force applied by the second shifting electric motor 220 by driving an actuator screw; as soon as the second shifting electric motor 220 is returned the initial position, the piston of the second hydraulic actuator cylinder 238 returns to the initial position by means of a return spring and the actuator screw reversed, and the hydraulic pressure is set to zero. As the second piston 246 and 243 are pulled away from the second dry brake disc 248 by the elastic force from the sealing ring, there are no friction between the second pad plates 244, 245 and the second dry brake disc 248.

CONCLUSION

Three alternative embodiments are highly preferred, of the present invention are disclosed, and it is to be clearly understood that the aforesaid embodiments are susceptible to numerous additional changes apparent to one skilled in the art. Therefore, the scope of the present invention is not to be limited to the details shown and described but is intended to include all changes and modifications which come within the scope of the appended claims.

As should now be apparent, the present invention teaches that a two-speed transaxle embodying the concepts of the present invention is capable of accomplishing the objects thereof.

What is claimed is:

1. A two-speed transaxle for an electric vehicle, comprising: an electric motor and transaxle drivable by the electric motor; wherein, the transaxle comprises a epicylic gear set, a first dry brake disc, a second dry brake disc, which are arranged coaxially to a rotational electric motor rotor shaft axis; the epicylic gear set comprises a base sun gear member, a first sun gear member, a second sun gear member, a plurality of base planet gears, a plurality of idler planet gears, a plurality of first planet gears, a plurality of second planet gears and a common planet carrier; the base sun gear member is rotatingly drivable by the electric motor around the rotational axis of the electric motor rotor shaft; the first sun gear member is simultaneously connected to the first dry brake disc and an inner race of a overrunning or one-way clutch through a first brake shaft; an outer race of the one-way clutch is fixed to a two-speed transaxle casing; the second sun gear member is connected to a second dry disc through a second brake shaft; a first caliper disc brake system and a second caliper disc brake system are mounted on the outside of the two-speed transaxle casing; the first caliper disc brake system comprises a first dry disc, a first speed sensors for watching state of the first dry disc, a first left pad plate, a first right pad plate, two pairs of first independent hydraulic pistons and two first calipers; the second caliper disc brake system comprises a second dry disc, a second speed sensors for watching state of the second dry disc, a second left pad plate, a second right pad plate, two pairs of second independent hydraulic pistons and two second calipers; and the plurality of base planet gears, idler planet gears, first planet gears and second planet gears are mounted on the common planet carrier, a first drive gear is roatationaly fixed or formed on the common planet carrier, the first drive gear is an output member for the epicylic gear set to transmit the power form the electric motor to a differential assembly;

the first and second dry brake discs are mounted on outside of the two-speed transaxle casing;

the transaxle further comprises a first shifting system and a second shifting system, the first shifting system is used to engage or disengage the first dry brake disc with the two-speed transaxle casing, and the second shifting system is used to engage or disengage the second dry brake disc with the two-speed transaxle casing; the first shifting system comprises a first shifting electric motor, a first hydraulic actuator cylinder, a first pressure warning switch and a first oil tank; the second shifting system comprises a second shifting electric motor, a second hydraulic actuator cylinder, a second pressure warning switch and a second oil tank; and the first and second shifting systems are mounted on the outside of the two-speed transaxle casing.

2. The two-speed transaxle for an electric vehicle according to claim 1, wherein the transaxle includes a rotatingly drivable input shaft which comprises means for introducing power, and the input shaft is fixed to or formed on the base sun gear member.

3. The two-speed transaxle for an electric vehicle according to claim 1, wherein the epicylic gear set and the electric motor are arranged axially.

4. The two-speed transaxle for an electric vehicle according to claim 1, wherein the plurality of idler planet gears are each configured to intermesh with both the base sun gear member and the plurality of the base planet gears.

5. The two-speed transaxle for an electric vehicle according to claim 1, wherein the plurality of first planet gears are in continuous meshing engagement with the first sun gear member, the first sun gear member is connected to an one-way overrunning clutch that is rotationally fixed to or formed on the inner race of the overrunning or one-way clutch, whose outer race is secured against rotation to the transaxle casing.

6. The two-speed transaxle for an electric vehicle according to claim 1, wherein the plurality of second planet gears are in continuous meshing engagement with the second sun gear member, the second sun gear member is rotationally fixed to or formed on the second brake shaft, which is connected to the second dry disc brake.

7. The two-speed transaxle for an electric vehicle according to claim 1, wherein the plurality of base planet gears, the plurality of second planet gears and the plurality of first planet gears are orderly rotationally fixed to or formed on planet shafts that are supported on the common planet carrier.

8. The two-speed transaxle for an electric vehicle according to claim 1, wherein the wall of the first hydraulic actuator cylinder is connected to the first oil tank at the front of the first hydraulic actuator cylinder, and the openings to the first pressure warning switch and a braking circuit at the back of the first hydraulic actuator cylinder; the first hydraulic actuator cylinder is mounted on outside of the two-speed transaxle casing or the vehicle floor, the first hydraulic actuator cylinder is operated by the force applied by the first shifting electric motor by driving an actuator screw.

9. The two-speed transaxle for an electric vehicle according to claim 1, wherein the wall of the second hydraulic actuator cylinder is connected to the second oil tank at the front of the second hydraulic actuator cylinder, and the openings to the second pressure warning switch and a braking circuit at the back of the second hydraulic actuator cylinder, the second hydraulic actuator cylinder is mounted on outside of the two-speed transaxle casing or the vehicle floor, the second hydraulic actuator cylinder is operated by the force applied by the second shifting electric motor by driving an actuator screw.

* * * * *